(12) United States Patent
Martin et al.

(10) Patent No.: US 7,894,358 B2
(45) Date of Patent: Feb. 22, 2011

(54) DETECTION OF HEAVY USERS OF NETWORK RESOURCES

(75) Inventors: Cecilia Martin, Morgan Hill, CA (US); John Huber, San Diego, CA (US); Mei Wang, Mountain View, CA (US); Jonathan Chang, Cupertino, CA (US); Flavio Bonomi, Palo Alto, CA (US); Sumeet Singh, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1013 days.

(21) Appl. No.: 11/724,911

(22) Filed: Mar. 15, 2007

(65) Prior Publication Data

US 2008/0225740 A1 Sep. 18, 2008

(51) Int. Cl.
*H04L 12/26* (2006.01)
*H04L 12/28* (2006.01)

(52) U.S. Cl. ........................ 370/252; 370/412
(58) Field of Classification Search ........................ None
See application file for complete search history.

(56) References Cited

U.S. PATENT DOCUMENTS

| | | | |
|---|---|---|---|
| 7,292,531 B1* | 11/2007 | Hill | 370/230.1 |
| 7,424,489 B1* | 9/2008 | Duffield et al. | 707/999.104 |
| 2004/0013112 A1 | 1/2004 | Goldberg et al. | |
| 2004/0190526 A1* | 9/2004 | Kumar et al. | 370/395.21 |
| 2005/0047411 A1 | 3/2005 | Kadambi et al. | |
| 2006/0072582 A1 | 4/2006 | Bronnimann et al. | |
| 2006/0098652 A1* | 5/2006 | Singh et al. | 370/389 |
| 2006/0227705 A1 | 10/2006 | Chandwadkar et al. | |
| 2006/0268859 A1* | 11/2006 | Smith | 370/389 |
| 2007/0061433 A1* | 3/2007 | Reynolds et al. | 709/223 |
| 2007/0076606 A1* | 4/2007 | Olesinski et al. | 370/230 |
| 2007/0211635 A1* | 9/2007 | Hao et al. | 370/235 |

OTHER PUBLICATIONS

Downloaded article from http://en.wikipedia.org/wiki/Bloom_filter, downloaded on Mar. 15, 2007, 7 pages.
Balaji Prabhakar, Clean Slate Seminar Presentation entitled "A Flow as the Minimum Data Unit", dated Oct. 17, 2005, 33 pages.
PCT Notification of Transmittal of The International Search Report and the Written Opinion of the International Searching Authority or the Declaration for Application No. PCT/US08/056116, dated Jul. 25, 2008.
PCT Notification of Transmittal of The International Search Report and the Written Opinion of the International Searching Authority, or the Declaration, dated Jul. 25, 2008.

* cited by examiner

*Primary Examiner*—Steven H Nguyen
(74) *Attorney, Agent, or Firm*—Weaver Austin Villeneuve & Sampson LLP

(57) ABSTRACT

A device includes a multistage filter and an elephant trap. The multistage filter has hash functions and an array. The multistage filter is operable to receive a packet associated with a candidate heavy network user and send the packet to the hash functions. The hash functions generate hash function output values corresponding to indices in the array. The elephant trap is connected to the multistage filter. The elephant trap includes a buffer and probabilistic sampling logic. The probabilistic sampling logic is operable to attempt to add information associated with the packet to the buffer a particular percentage of the time based in part on the result of the multistage filter lookup. The buffer is operable to hold information associated with the packet, counter information, and timestamp information.

23 Claims, 8 Drawing Sheets

DETECTION OF HEAVY USERS OF NETWORK RESOURCES

TECHNICAL FIELD

The present disclosure relates to detection of heavy users of network resources.

DESCRIPTION OF RELATED ART

A network typically includes limited resources. A small percentage of users often disproportionately consume a large percentage of network resources. It is often useful for a system or network administrator to identify this small percentage of users and associated streams. In particular examples, some heavy users, or heavy hitters, may be rate limited or barred from network access altogether. In other examples, detection of heavy users may allow a system or network administrator to identify viruses or sources of spam. In still other examples, detection of heavy users allows more efficient billing and tracking.

However, mechanisms for detecting heavy users and associated streams have significant limitations. Consequently, it is desirable to provide improved techniques and mechanisms for detecting heavy users in a network.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Figure 1:
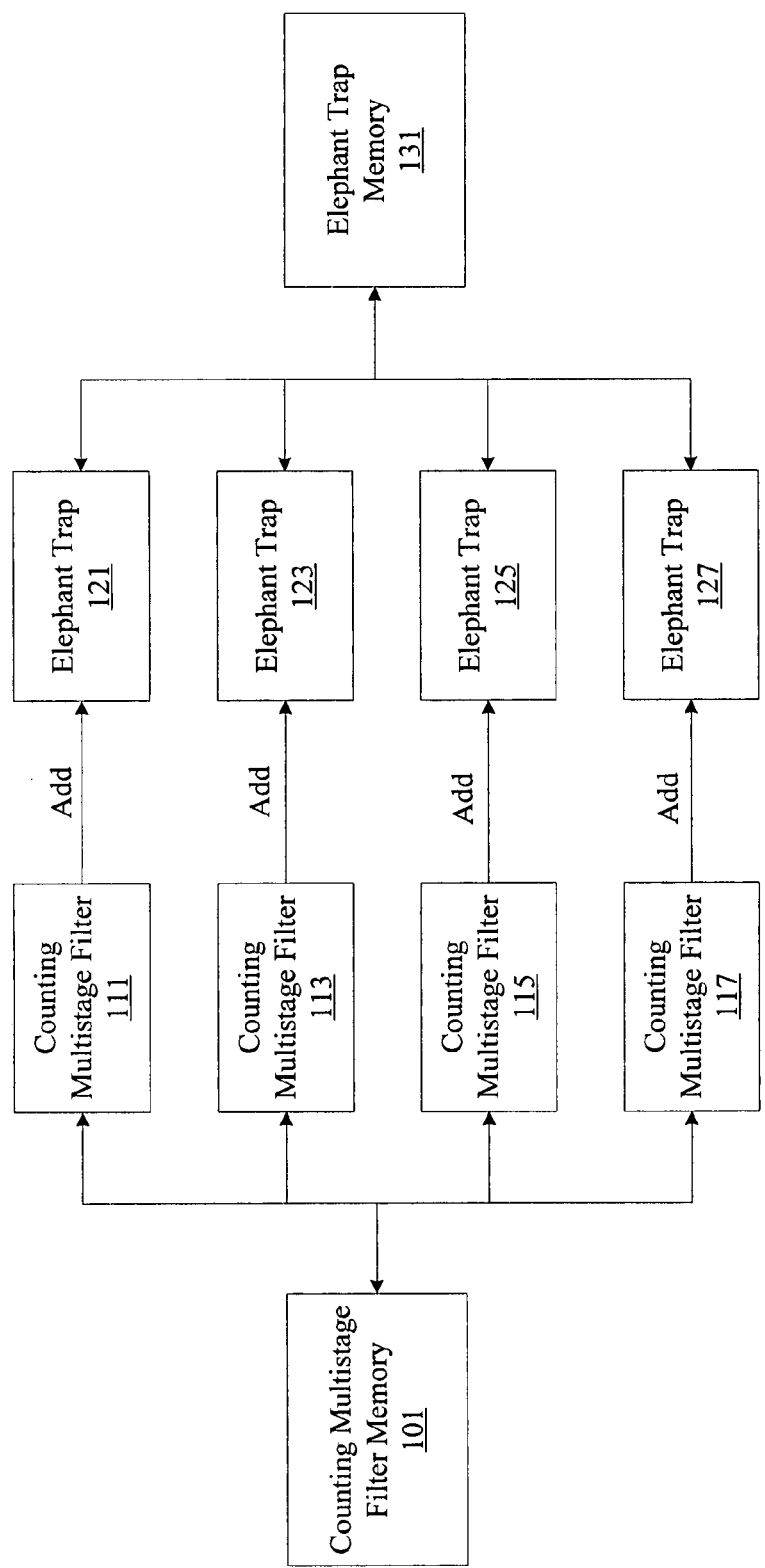
FIG. 1 illustrates a particular example of a heavy user detection system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular multistage filters, probabilistic sampling mechanisms, buffers, packets, and networks. However, it should be noted that the techniques of the present invention apply to a variety of filters, probabilistic sampling mechanisms, buffers, packets, and a variety of different networks. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A device includes a counting multistage filter and an elephant trap. The counting multistage filter includes hash functions and an array. The counting multistage filter is operable to receive a packet associated with a candidate heavy network user and send the packet to multiple hash functions. The multiple hash functions generate hash function output values corresponding to indices in an array. The elephant trap is connected to the counting multistage filter. The elephant trap includes a buffer and probabilistic sampling logic. The probabilistic sampling logic is operable to attempt to add information associated with the packet to the buffer a particular percentage of the time. The buffer is operable to hold information associated with the packet, counter information, and timestamp information.

Example Embodiments

In many networks, a relatively small number of users and associated streams consume a disproportionate amount of network resources. In particular examples, it may be useful for a system to identify users and associated streams that consume the most bandwidth or otherwise use the most network resources. The system can then identify the users for billing purposes, or pinpoint misbehaving source devices, or apply a policy such as a rate limiting policy to the particular streams. However, many conventional mechanisms for performing heavy user detection or heavy hitter detection are inefficient and inaccurate.

Multistage filters are data structures that allow a system to determine if particular user or stream is a member of a set, such as a set of heavy users or heavy hitters. A multistage filter typically includes hash functions and an array. According to particular example embodiments, the array can be a multi-bit array, a multi dimensional array, bitmap, etc. Multistage filters allow a system to perform membership tests using a smaller amount of memory than the system would need if it stored a full list of members or even a full list of abbreviated member identifiers. By avoiding an extensive lookup of a member, a system can avoid performing extensive database lookups and costly searches.

In particular example embodiments, a multistage filter is a bloom filter that includes multiple hash functions and a bit array. To add an element to a bloom filter, a system sends the element to the multiple hash functions to produce multiple hash function output values. A system may set particular array entries based on the hash function output values. In particular example embodiments, the hash function output value range is set to correspond to the bloom filter array size. For example, if a bloom filter array size is 100, the hash function is set to output values between 1 and 100. In a particular simplified example, an element 52827 is added by hashing the element 52827 to provide hash function output values 2, 6, 75, and 98 in a 100 entry array. A system uses the hash function output values 2, 6, 75, and 98 to set the bits at index positions 2, 6, 75, and 98 in the 100 entry array. To determine if an element is a member of a set, the system hashes the element and checks the array bits at the index positions corresponding to the hash function output values. If all of the array bits at the index positions are set, the element is deemed to be a member of the set.

However, multiple elements may sometimes set the same bits. For example, an element 90723 may have hash function output values 2, 6, 80, and 90 while an element 81372 may have hash function output values 10, 20, 75, and 98. If elements 90723 and 81372 are both added to the bloom filter, it will appear that element 52827 is a member of the set even if it was not added. Consequently, bloom filters do produce false positives. Also, because different elements often times set the same array entries, a system can not easily remove a member from a bloom filter without affecting the membership status of other members.

However, the memory savings and efficiency provided by bloom filters do have several drawbacks. Although a bloom filter does not produce false negatives, it does produce false positives. In a particular example, a bloom filter may identify a particular source as a heavy user even if the particular source does not use many network resources. A wide range of variations to a bloom filter are available. In some instances, a bloom filter includes counters in each array entry. Each array entry includes a counter instead of merely a bit. To prevent counter overflow or saturation, designers set counters to 8 or 16 bits. When a system adds an element, the system increments counters at array positions corresponding to hash function output values of the element. As noted above, sometimes multiple elements set the same array entries, so it is typically difficult to remove an element without affecting the membership status of other element. However, a system can use counters to track how many times a particular element has been set. When a system deletes an element, the system decrements array entries corresponding to the hash function output values. Counters allow deletion of elements without affecting the membership status of other elements.

According to particular example embodiments, a counting multistage filter also provides a supplemental rate limiting lookup mechanism. In particular example embodiments, a rat limiting ternary content address memory (TCAM) determines the rate limiting level for a particular source port and destination port pair.

A counting multistage filter can detect all entities that have appeared more than a particular number of times. However, because the counting multistage filter uses hashing into smaller key-spaces, it can sometimes lead to falsely classifying an entity as part of the heavy user group. Consequently, various example embodiments contemplate an elephant trap mechanism that is connected to the bloom filter. In particular example embodiments, the bloom filter removes false negatives while an elephant trap removes false positives to efficiently provide an accurate listing of heavy users to a system.

An elephant trap can be used to detect the heaviest users. In particular example embodiments, the elephant trap detects the top N heaviest users. The elephant trap includes a probabilistic sampling mechanism that uses random sampling to select candidate heavy users. According to various embodiments, a system will more frequently sample a heavy user for selection. The elephant trap also includes a buffer with entries having counter information and timestamp information. If a candidate heavy user is selected and the candidate heavy user already has an entry in the buffer, the counter information is updated. According to particular example embodiments, the counter is incremented. If the candidate user does not already have an entry in the buffer, the candidate heavy user is added to the buffer if there is room or an entry in the buffer can be evicted to make room. According to various embodiments, a system evicts stale entries that have low counter values.

In particular example embodiments, a system typically selects and adds the heaviest users and associated streams to the buffer most frequently. The entries corresponding to the heaviest users typically have the highest counter values and the most recent time stamps. Entries in the buffer correspond to heavy users and non-heavy users are not maintained in the buffer. However, there are possibilities where heavy users are not sampled sufficiently and consequently are not included in the buffer.

Consequently, an elephant trap may not report a heavy user while a counting multistage filter may falsely report a heavy user. According to particular example embodiments, an elephant trap is combined with a counting multistage filter to generate a system that uses a counting multistage filter to filter out false negatives and an elephant trap to filter out false positives. The result provides an efficient mechanism for detecting all heavy users appearing more than N times as well as identifying a particular number of the heaviest users. The counting multistage filter and the elephant trap can be configured with separate reporting mechanisms that allow independent usage as well as combined usage. By using both an elephant trap and a counting multistage filter, heavy users can be accurately determined while removing both false positives and false negatives.

FIG. 1 illustrates a particular example of a heavy user or heavy hitter detection system. The heavy user detection system includes counting multistage filter 11, counting multistage filter 113, counting multistage filter 115, and counting multistage filter 117 connected to a counting multistage filter memory 101. According to particular example embodiments, the counting multistage filter memory 101 is an array. According to particular example embodiments, the counting multistage filters 111, 113, 115, and 117 include hash functions operable to provide evenly distributed output values to the various entries in the bit array 101. In particular example embodiments, bit array 101 includes 64k entries, each including 4 stages with counters having a particular size, such as 8 bits or 16 bits. The size of the bit array 101 is typically set based upon the desired false positive percentage. In particular example embodiments, the number of elements installed in a bloom filter having four hash functions should be approximately 10-20% of the number of entries in a bloom filter array in order to obtain a false positive rate of 1%.

The heavy user detection system also includes elephant trap blocks 121, 123, 125, and 127 connected to elephant trap memory 131. According to particular example embodiments, elephant trap memory is an array having 512 entries. The elephant trap blocks 121, 123, 125, and 127 can operate independently from counting multistage filter blocks 111, 113, 115, and 117, or they can operate with the counting multistage filter blocks 111, 113, 115, and 117 providing input to the elephant trap blocks 121, 123, 125, and 127. In particular example embodiments, the elephant trap blocks 121, 123, 125, and 127 probabilistically select candidate heavy users and maintain heavy users in elephant trap memory 131 based on hit frequency and entry creation times. Heavy users that have not had a recent hit are more likely to be removed from elephant trap memory 131.

Figure 2:
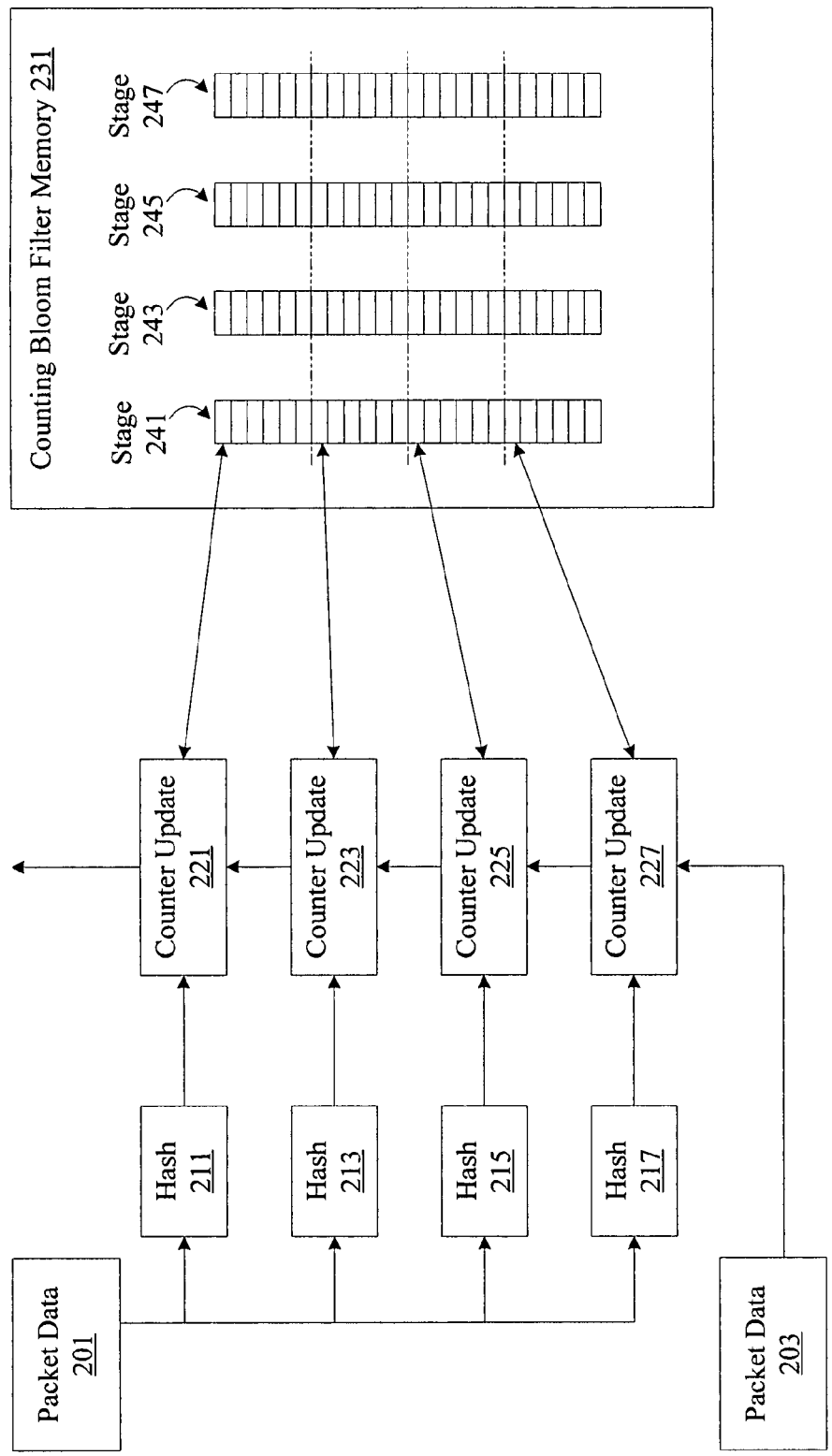
FIG. 2 illustrates a particular example of a counting multistage bloom filter.

FIG. 2 illustrates a particular example of a counting multistage filter (CMF). Although a particular counting multistage bloom filter is described, it should be noted that a variety of bloom filters can be used including non-counting bloom filters and single stage bloom filters.

According to particular example embodiments, the counting multistage filter includes four header signature generation blocks that may be implemented using hash functions 211, 213, 215, and 217. The counting multistage filter also includes counter update blocks 221, 223, 225, and 227. Packet data 201 is provided to the hash functions 211, 213, 215, and 217. In particular example embodiments, packet data 201 is combined using an AND function with a mask that selects key identification information such as source port and destination port from the packet data 201. According to particular example embodiments, the Galois hash value is computed across the masked result to generate a hash key or a hash function output value. In particular example embodiments, the source port and destination port fields are sent along with the corresponding hash function output value to counter update blocks 221, 223, 225, and 227.

The counting multistage filter also includes memory 231. According to particular example embodiments, the memory includes four stages 241, 243, 245, and 247. In particular example embodiments, each stage includes 64K 8-bit counters or 32K 16-bit counters stored in a memory array. These counters are shared between the four counter update blocks 221, 223, 225, and 227 and are configurable in increments of varying size. According to particular example embodiments, software can initialize and reset each of the counters in the counting multistage filter.

According to particular example embodiments, the counter update blocks 221, 223, 225, and 227 can be configured for three different types of operations: increment, conservative increment, and decrement. For each of these operations, the counters can be configured to either be incremented or decremented for each packet by the packet length or by 1. In particular example embodiments, when a new packet arrives, the packet data 203 is sent to each of the counter update blocks. Each block 221, 223, 225, and 227 compares its procedure identifiers to the valid procedure identifiers in the packet data 203 and determine if it needs to do a increment/decrement counter update. If procedure identifiers do not match any of those in the packet data 203 or if both the increment and decrement procedure IDs match, a system takes no action.

For a counter increment action, a system reads four counters from the multistage filter array memory 231. According to particular example embodiments, the multistage filter array memory 231 is arranged into four stages and a system only reads one counter from each stage.

According to particular example embodiments, each counter update block has a base address register (cmf cntr_base_adr) which is programmable. In particular example embodiments, each block includes 4 signature offset value registers (cmf sig_ofs0-3) that are bit offsets within the signature. Each block also can contains a bit mask width register (cmf sig_adr width) that defines the number of counters that can be accessed in each stage (2 cmf sig_adr width counters can be accessed).

According to particular example embodiments, after a system reads the four counters, the system increments either all or only the lowest counters depending on whether conservative update is set for the block. A system then compares the incremented values to a programmable threshold that may scale with the number of performed counter increments. According to particular example embodiments, if all 4 counters exceed the threshold, an ADD signal is asserted to the elephant trap block indicating the packet entry should be inserted into the elephant trap for more accurate tracking of heavy users. Any data packet that has exceeded a threshold can also be reported to a system. According to particular example embodiments, if a counter has not exceeded the threshold, the counter is written back to the multistage filter memory.

For a counter decrement action, a system reads the four counters. In this case, the system decrements all four counters by 1 or by the packet length regardless of whether or not the conservative update is set as long as the new value is not less than or equal to 0. The system writes the counters back to memory. In particular example embodiments, the system performs no threshold comparison for counter decrements.

Figure 3:
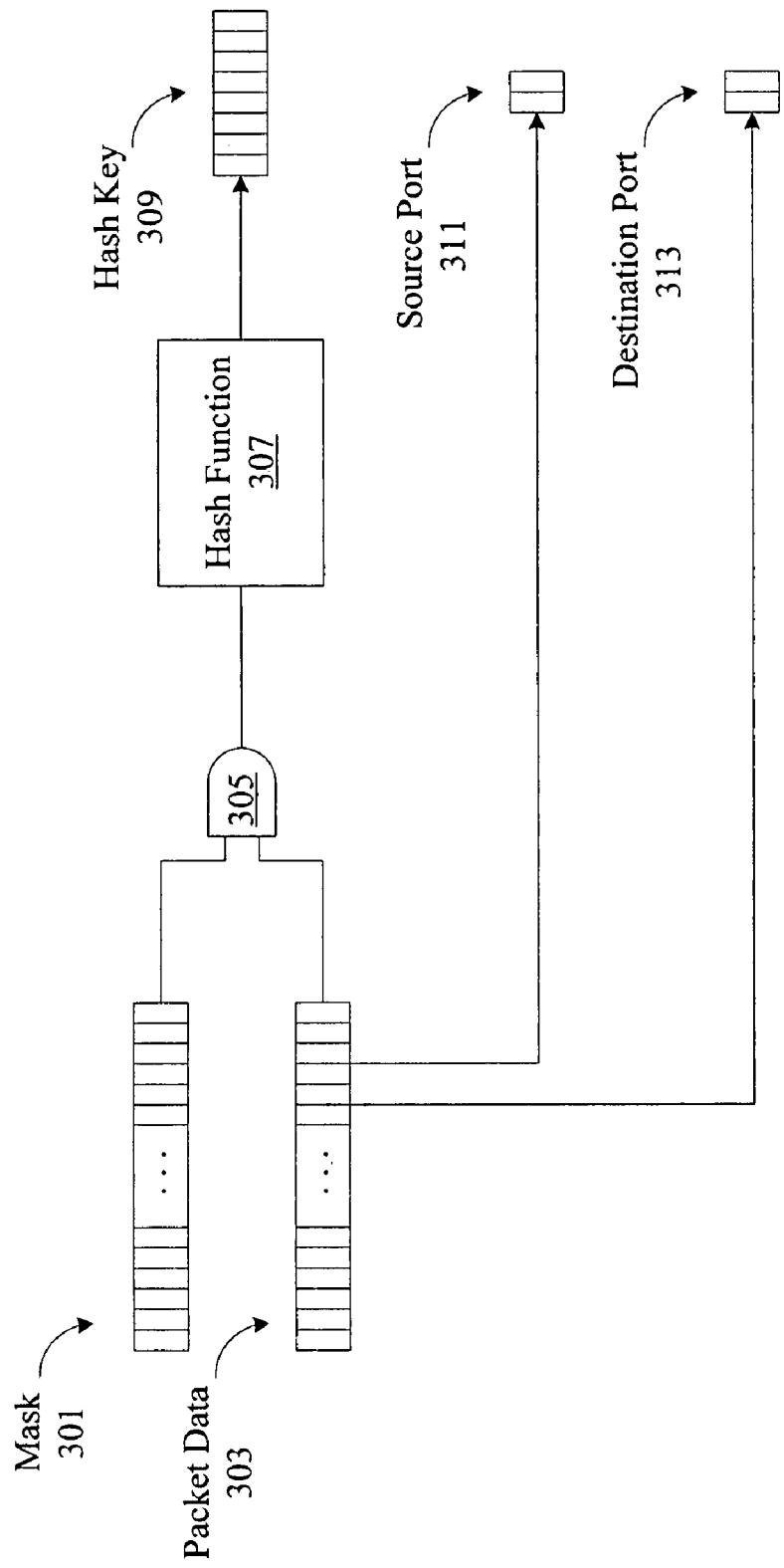
FIG. 3 illustrates a particular example of a data parser.

FIG. 3 illustrates one example of a packet parser. According to particular example embodiments, a variety of mechanisms can be used to provide data to a counting multistage filter. In particular example embodiments, a mask 301 along with AND logic 305 is provided with a hash function 307. The mask 301 is applied to packet data 303 and a logical AND operations is applied to the result. A hash function 307 generates a hash key 309 or a hash function output 309. Source port 311 and destination port 313 is also extracted from packet data 303.

Figure 4:
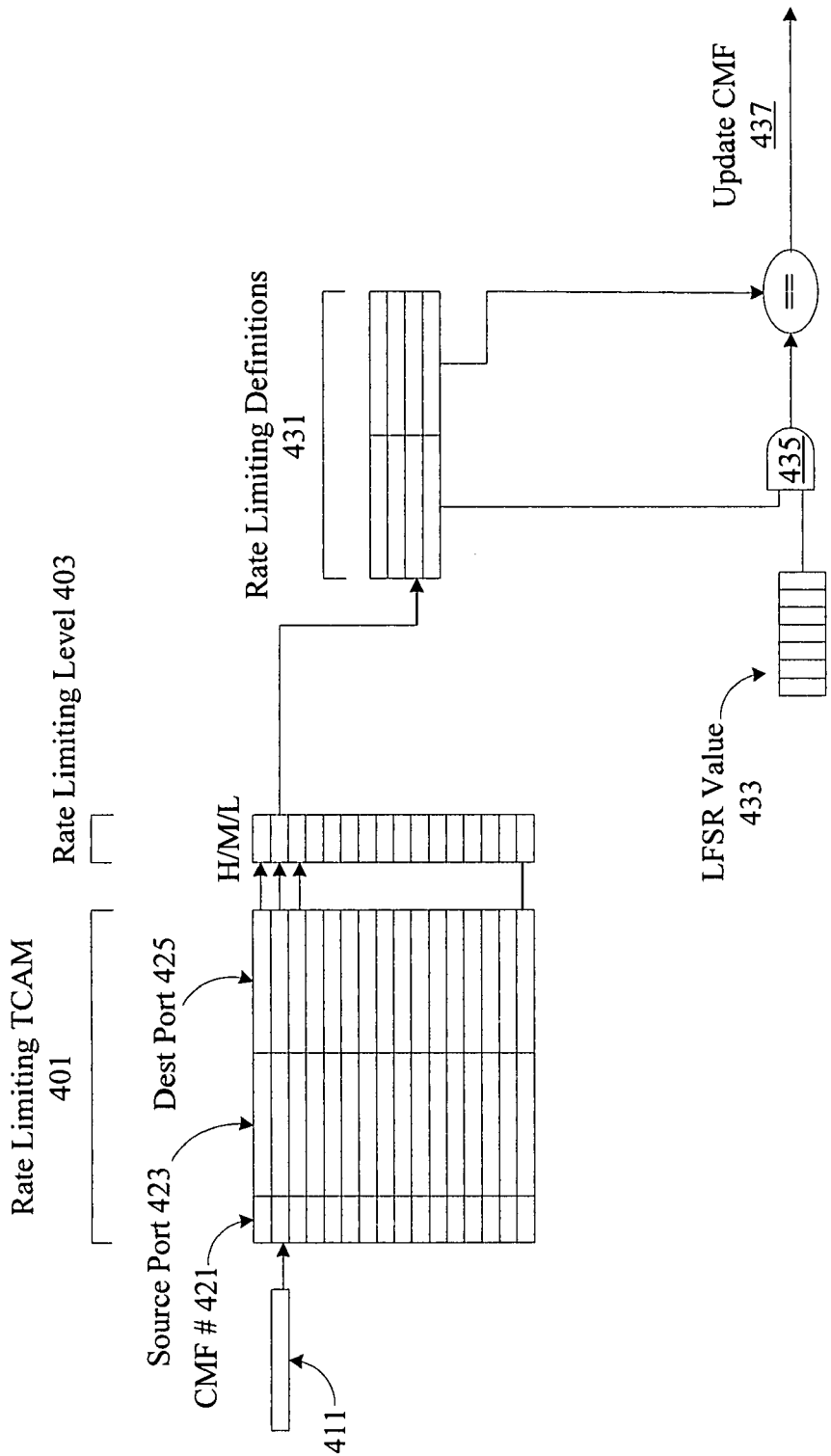
FIG. 4 illustrates a particular example of rate limiting lookup.

FIG. 4 illustrates a rate limiting lookup. According to particular example embodiments, the counting multistage bloom filter number, source port, and destination port data 411 identifies an entry in a table such as a rate limiting ternary content addressable memory (TCAM) 401. In particular example embodiments, the TCAM has fields filter number 421, source port 423, and destination port 425, as well as a rate limiting level 403. If a match is found in the TCAM, the 2-bit register associated with that entry is used to specify a high, medium or low rate limiting value 403 or if no match is found, a system selects the default rate limiting value. A rate limiting level 403 is used to access rate limiting definitions 431. Each level specifies a rate limiting mask and value. The rate limiting mask is ANDed with an LFSR value 433. If the value does not match the rate limiting value, the hash key is dropped.

A counting multistage bloom filter can also have a variety of other features. According to particular example embodiments, a flow cutoff feature can be used to limit the number of different flows that can enter a counting multistage filter to prevent pollution of the counters. In particular example embodiments, a flow cutoff feature uses a counter threshold and stage threshold.

Figure 5:
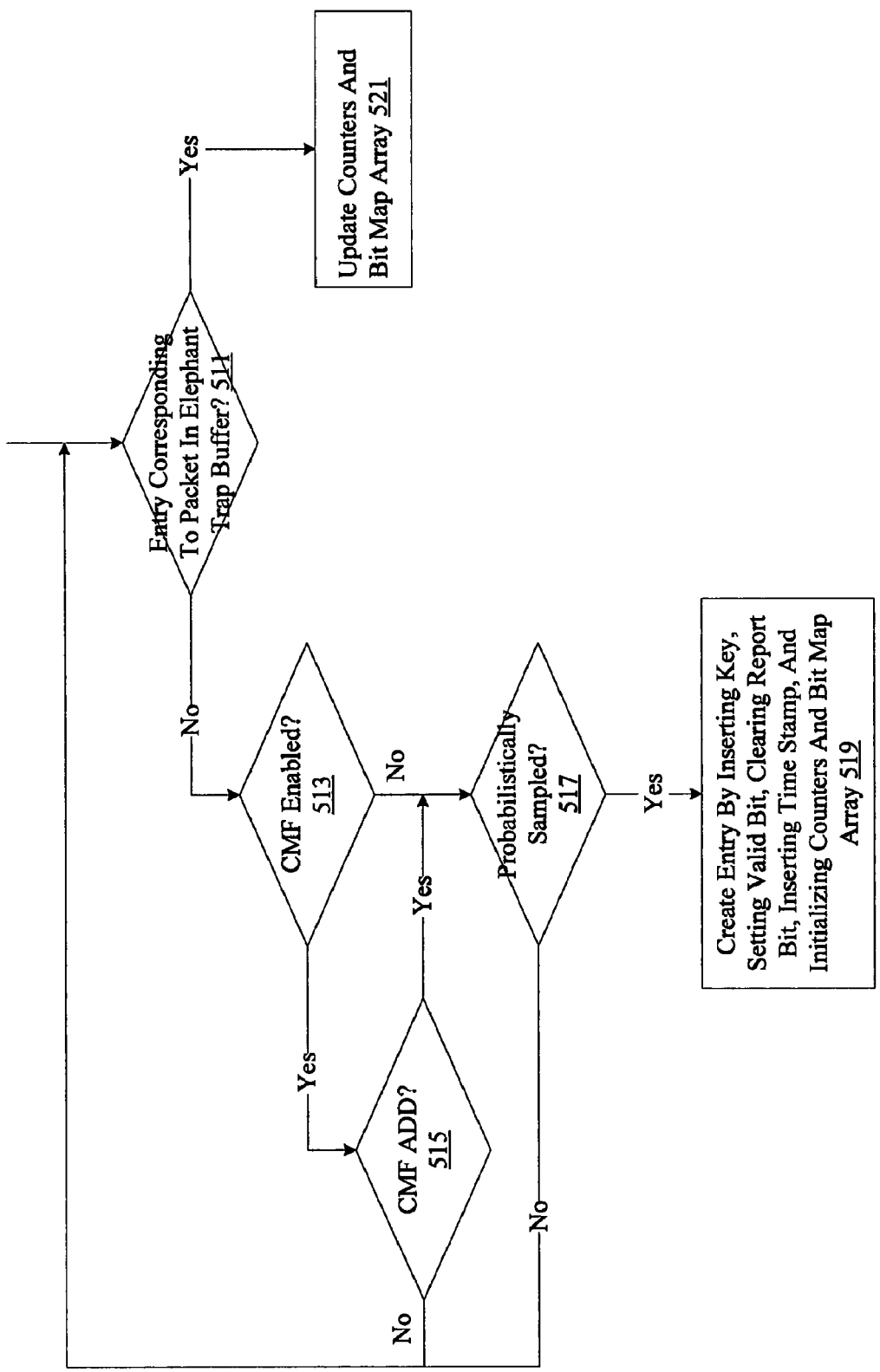
FIG. 5 illustrates a particular example of elephant trap cache lookup.

FIG. 5 illustrates a cache lookup using an elephant trap. According to particular example embodiments, an elephant trap implements a caching scheme aimed at identifying heavier users or heavier traffic streams. In particular example embodiments, the scheme combines probabilistic sampling with a modified buffer, e.g. First In First Out (FIFO), eviction scheme. Probabilistic sampling determines new candidate entries for insertion into an elephant trap (ET) buffer. Probabilistic sampling tends to filter out small flows while accepting large flows for creation of entries. According to particular example embodiments, a modified FIFO eviction scheme intelligently selects entries in the elephant trap for eviction to reduce the eviction of large flows from a buffer.

According to particular example embodiments, if the elephant trap is active, the system performs a lookup for an entry corresponding to packet data. In particular example embodiments, an AND operation masks unused fields in packet data. According to particular example embodiments, packet data is compared to elephant trap entries having key, valid, report, creation timestamp, hit count, byte count and bit map array fields.

If there is a miss at 511, a system determines if a counting multistage filter is active at 513. If the counting multistage filter is inactive and the elephant trap is operating independently, the system sends masked packet data to the probabilistic sampling logic at 517. If the probabilistic sampling logic samples the data at 517, the elephant trap creates an entry at 519. According to particular example embodiments, creating an entry includes inserting a key, setting a valid bit, clearing a report bit, inserting a timestamp, and initializing counter and/or bitmaps. If a system determines that an entry is already resident in the buffer at 511, an entry is updated at 521. In particular example embodiments, a system modifies counters and/or bitmaps. A system can leave other fields such as the key, valid, report and the creation timestamp unchanged.

If there is a miss and the elephant trap and counting multistage filter are operating as a unit, the elephant trap checks for an add signal from the counting multistage filter. A counting multistage filter sends an add signal if the packet data corresponds to an entry in the bloom filter array which has crossed the threshold. If the counting multistage filter asserts an ADD signal at 515, the system provides the masked packet data to the probabilistic sampling logic at 517. If the probabilistic sampling logic selects the data at 517, the elephant trap creates an entry at 519. According to particular example embodiments, creating an entry includes inserting a key, setting a valid bit, clearing a report bit, inserting a timestamp, and initializing counter and/or bitmaps.

Figure 6:
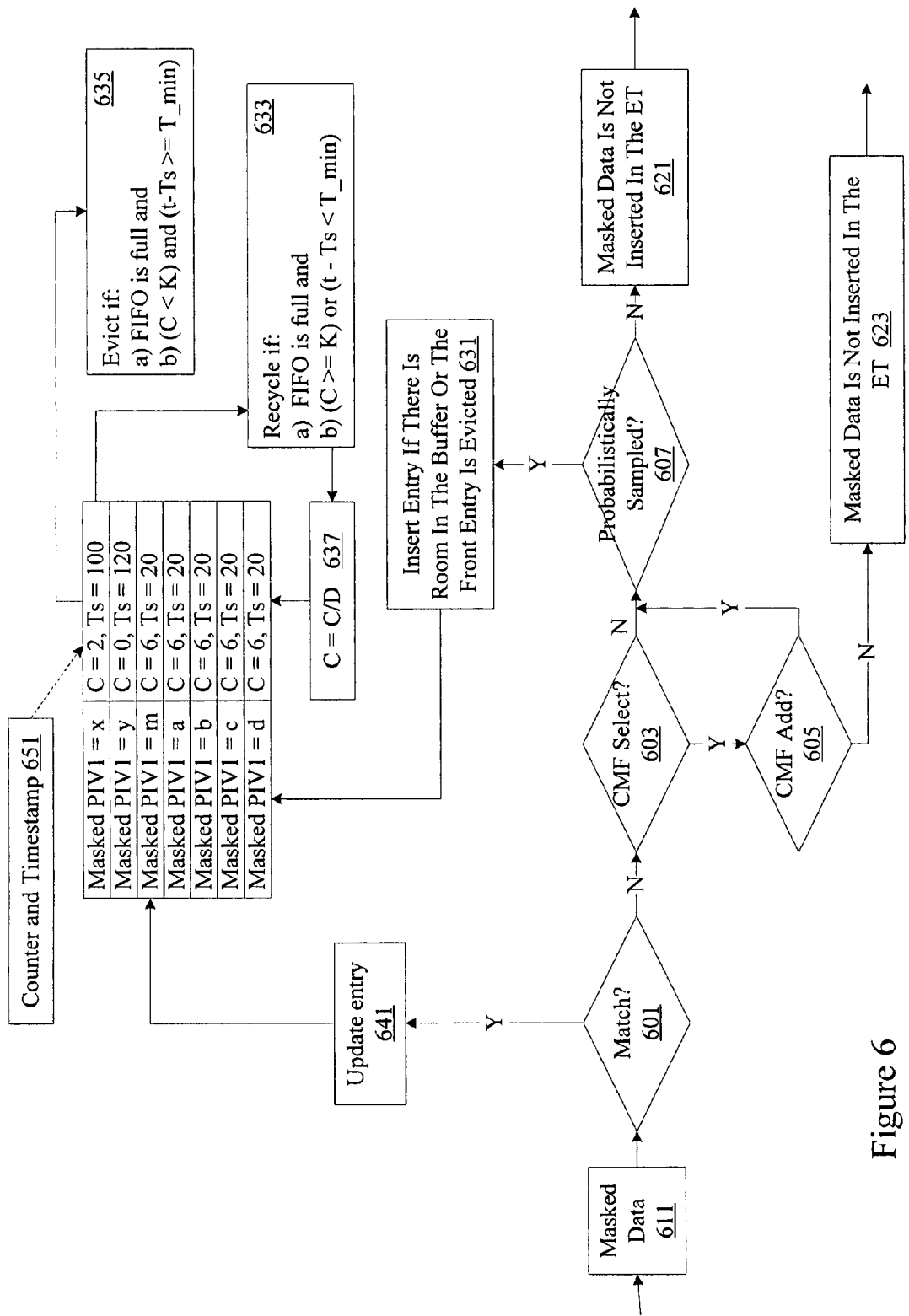
FIG. 6 illustrates a particular example of elephant trap eviction and recycling.

FIG. 6 illustrates eviction and recycling in an elephant trap buffer. According to particular example embodiments, the elephant trap includes a FIFO. In particular example embodiments, the elephant trap operates in parallel with a counting multistage filter. In other examples, the elephant trap is active after the counting multistage filter performs a lookup or adds a user to the counting multistage filter array. According to particular example embodiments, a system sends masked data 611 to an elephant trap. The masked data may provide source port and destination port information along with other information. If the masked data corresponds to an entry in the elephant trap buffer at 601, the entry is updated at 641.

According to particular example embodiments, a system modifies the entry in the elephant trap buffer 651 by increasing the counter and updating the timestamp. If the masked data does not correspond to any entry in the elephant trap buffer at 601, a system determines if a counting multistage filter is active at 603. If a counting multistage filter is inactive at 603 or the counting multistage filter is active and a counting multistage filter addition is asserted at 605, the system sends the masked data 611 to probabilistic sampling mechanism 607. If the counting multistage filter did not assert an addition signal, the masked data is not inserted into the elephant trap at 623. The use of a counting multistage filter prevents false negatives from being added to an elephant trap buffer.

According to particular example embodiments, the probabilistic sampling mechanism randomly selects candidate masked data packets for insertion attempts. A system would more likely select heavy users at 607 because a system would more frequently sample heavy user packets and less frequently sample light user packets. If a system does not select the packet at 607, the data is not inserted into the elephant trap. Otherwise, an entry is inserted at 631 if there is room in the buffer 651 or the front entry is evicted from the buffer 651. In particular example embodiments, a system inserts an entry at 631 if there is no match, a probability sampling is met, and there is room or a front entry is evicted.

According to particular example embodiments, the elephant trap performs intelligent buffer management. In particular example embodiments, a system inserts entries from the bottom if the elephant trap is not full and evicts entries from the top if the elephant trap is full. If the elephant trap is full, a system evicts entries when the associated count C (configurable to be either hit count or byte count) is below a threshold K and when the difference between the current time t and the associated creation timestamp Ts exceeds or equals a threshold time T_min. In particular example embodiments, a system evicts if (C<K) and (t−Ts>=T_min). According to particular example embodiments, if the elephant trap is full, a system recycles entries from the top of the cache to the bottom of the cache when no entry is evicted. The associated count C is shifted right by a constant value D or otherwise decrement or divided before the entry is written to the bottom of the elephant trap. In particular example embodiments, a system recycles if (C>=K) or (t−Ts<T_min). The timestamp may also be updated on recycling if (C>=K) or (t−Ts>=T_min).

Figure 7:
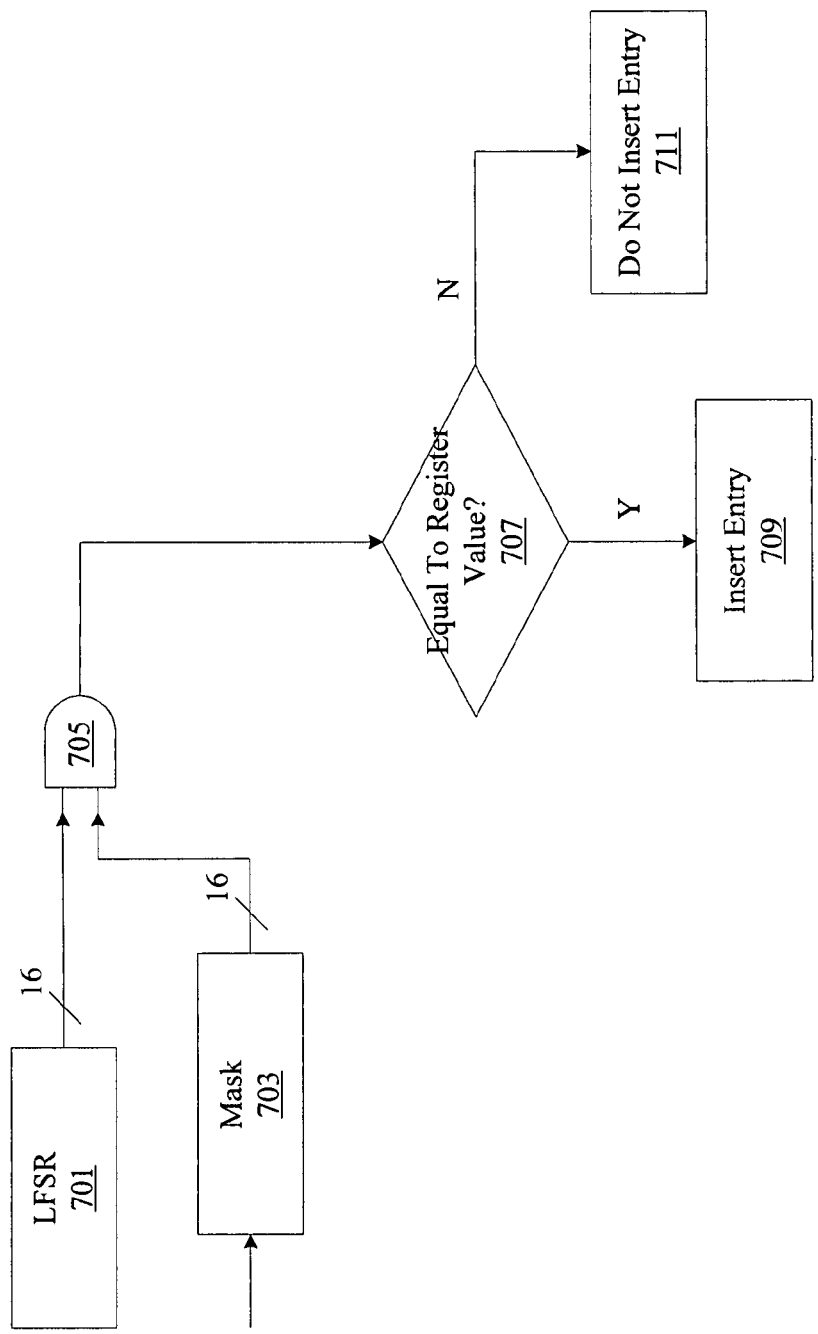
FIG. 7 illustrates a particular example of a probabilistic sampling mechanism.

FIG. 7 illustrates one example of probabilistic sampling logic. According to particular example embodiments, probabilistic sampling logic decides whether an entry creation attempt is made on a miss to the elephant trap. In particular example embodiments, a Linear Feedback Shift Register (LFSR) operates as a random number generator. According to particular example embodiments, the LFSR either shifts and updates once every time a new packet comes in or shifts and updates every clock cycle. In particular example embodiments, the LFSR is a Fibonacci implementation of the 16 bit primitive polynomial x́ 16+x́ 5+x́ 3+x́ 2+1. This implementation has four taps and is initialized to all ones at reset. A system loads the LFSR with a programmable value.

According to particular example embodiments, a system compares the lowest 4 bits of the LFSR output to the value in a programmable compare register. If there is a match, an elephant trap entry is created. According to particular example embodiments, the probability can be changed by changing the number of bits compared. The number of comparison bits, and their locations are set using a 16 bit mask register. According to particular example embodiments, the system performs an AND operations with the mask register and the 16 bit output of the LFSR. The result is compared to the compare register. For example, if the mask register is 16'h00ff (lower 8 bits are compared) and the LFSR output is 16'h5f00, the result is 16'h0000. If the compare register is 16'h0000, the entry is created. If the LFSR output is 16'h5f0d, the result is 16'h000d and the entry is not created. Mask register and compare register values of 16'h0000 disable the probabilistic sampling by forcing a match.

A variety of devices and applications can use particular examples of bloom filters. Server, routers, switches, line cards, can all implement elephant traps and bloom filters to perform various functions.

Figure 8:
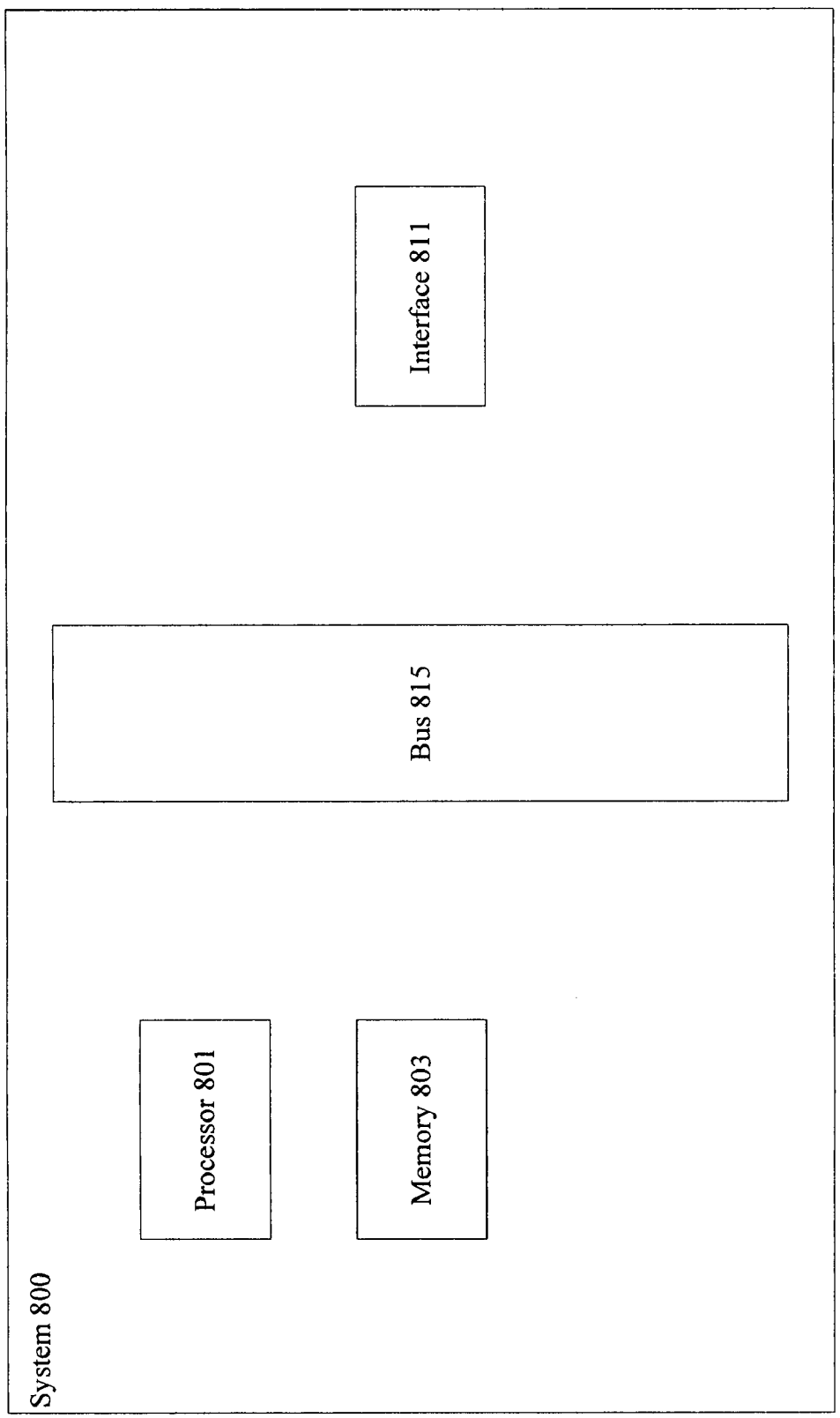
FIG. 8 illustrates a particular example of a network device.

FIG. 8 illustrates one example of a device that can use a combined elephant trap and counting multistage filter. According to particular example embodiments, a system 800 suitable for implementing particular embodiments of the present invention includes a processor 801, a memory 803, an interface 811, and a bus 815 (e.g., a PCI bus). When acting under the control of appropriate software or firmware, the processor 801 is responsible for such tasks such as elephant trap and counting multistage filter management. Various specially configured devices can also be used in place of a processor 801 or in addition to processor 801. The interface 811 is typically configured to send and receive data packets or data segments over a network. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A device, comprising:
a multistage filter including a plurality of hash functions and an array, the multistage filter operable to receive a packet associated with a candidate heavy network user and send the packet to the plurality of hash functions, wherein the plurality of hash functions generate a plurality of hash function output values corresponding to a plurality of indices in the array;
wherein an elephant trap is associated with the multistage filter, the elephant trap operable to receive a signal from the multistage filter, the elephant trap including a buffer and probabilistic sampling logic, the probabilistic sampling logic operable to attempt to add information associated with the packet to the buffer a first percentage of the time, wherein the buffer is operable to hold information associated with the packet, counter information, and timestamp information.

2. The device of claim 1, wherein a plurality of array elements each have a multiple bit length.

3. The device of claim 2, wherein the counting multistage bloom filter is operable to identify network users of network resources who cross a predetermined threshold.

4. The device of claim 2, wherein the candidate heavy network user is added to the multistage filter by incrementing a plurality of counters at array positions corresponding to the hash function output values for the candidate heavy network user.

5. The device of claim 4, wherein the candidate heavy network user is determined to be a member of the multistage filter if the values of the plurality of counters at array positions corresponding to the hash function output values for the candidate heavy network user are greater than a predetermined threshold.

6. The device of claim 1, wherein the buffer is first in first out (FIFO) buffer including a plurality of buffer entries, each of the plurality of buffer entries including counter information and timestamp information.

7. The device of claim 6, wherein an attempt is made to add information associated with the packet for the candidate heavy network user to the buffer if the candidate heavy network user is a member of the multistage filter and the information associated with the packet passes the probabilistic sampling logic.

8. The device of claim 7, wherein information associated with the packet associated with the candidate heavy network user is added to the buffer if information associated with the packet is not already in the buffer.

9. The device of claim 7, wherein information associated with the packet associated with the candidate heavy network user is added to the buffer if information associated with the packet is not already in the buffer and there is an empty buffer entry.

10. The device of claim 6, wherein one of the plurality of buffer entries is evicted if the buffer is full, the counter information is less than a counter threshold and the difference between the current time and the timestamp information exceeds a minimum time threshold.

11. The device of claim 5, wherein one of the plurality of buffer entries can be evicted.

12. The device of claim 6, wherein one of the plurality of buffer entries is evicted if:
($C<K$) and ($t-Ts>=T\_min$);
where
C is a hit count;
K is a threshold;
t is a current time;
Ts is a creation timestamp; and
T_min is a minimum threshold time.

13. The device of claim 6, wherein one of the plurality of buffer entries can be recycled.

14. The device of claim 6, wherein one of the plurality of buffer entries is recycled if:
($C>=K$) or ($t-Ts<T\_min$);
where
C is a hit count;
K is a threshold;
t is a current time;
Ts is a creation timestamp; and
T_min is a minimum threshold time.

15. A method, comprising:
  receiving packet data associated with a candidate heavy network user;
  determining that packet data does not correspond to an entry in an elephant trap buffer associated with an elephant trap;
  receiving a signal that the packet data has an entry in a multistage filter connected to the elephant trap;
  performing probabilistic sampling on the packet data;
  adding the packet data to the elephant trap buffer.

16. The method of claim 15, wherein the multistage filter includes a plurality of hash functions and an array, the multistage filter operable to receive the packet data associated with a candidate heavy network user and send the packet to the plurality of hash functions, wherein the plurality of hash functions generate a plurality of hash function output values corresponding to a plurality of indices in the array.

17. The method of claim 15, wherein the elephant trap is connected to the multistage filter, the elephant trap including the buffer and probabilistic sampling logic, the probabilistic sampling logic operable to attempt to add information associated with the packet to the buffer a first percentage of the time, wherein the buffer is operable to hold information associated with the packet, counter information, and timestamp information.

18. The method of claim 17, wherein one of the plurality of buffer entries is evicted if the buffer is full, the counter information is less than a counter threshold and the difference between the current time and the timestamp information exceeds a minimum time threshold.

19. The method of claim 15, wherein one of the plurality of buffer entries is evicted if:
  $(C<K)$ and $(t-Ts>=T\_min)$;
  where
  C is a hit count;
  K is a threshold;
  t is a current time;
  Ts is a creation timestamp; and
  T_min is a minimum threshold time.

20. The method of claim 15, wherein one of the plurality of buffer entries is recycled if:
  $(C>=K)$ or $(t-Ts<T\_min)$;
  where
  C is a hit count;
  K is a threshold;
  t is a current time;
  Ts is a creation timestamp; and
  T_min is a minimum threshold time.

21. A system, comprising:
  means for receiving packet data associated with a candidate heavy network user;
  means for determining that packet data does not correspond to an entry in an elephant trap buffer associated with an elephant trap;
  means for receiving a signal that the packet data has an entry in a multistage filter connected to the elephant trap;
  means for performing probabilistic sampling on the packet data;
  means for adding the packet data to the elephant trap buffer if there is room in the elephant trap buffer or an entry is being evicted from the elephant trap buffer.

22. The system of claim 21, wherein the multistage filter includes a plurality of hash functions and an array, the multistage filter operable to receive the packet data associated with a candidate heavy network user and send the packet to the plurality of hash functions, wherein the plurality of hash functions generate a plurality of hash function output values corresponding to a plurality of indices in the array.

23. The system of claim 21, wherein the elephant trap is connected to the multistage filter, the elephant trap including the buffer and probabilistic sampling logic, the probabilistic sampling logic operable to attempt to add information associated with the packet to the buffer a first percentage of the time, wherein the buffer is operable to hold information associated with the packet, counter information, and timestamp information.

* * * * *